Figure 1:
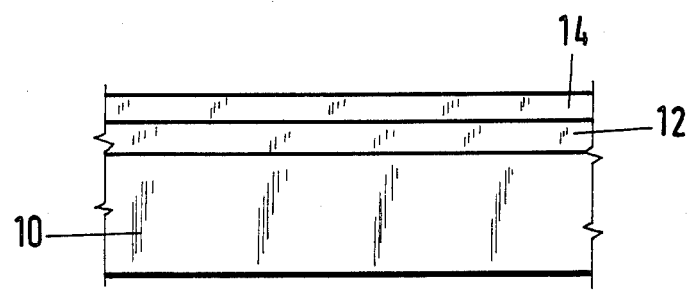

United States Patent [19]

Schmitte et al.

[11] Patent Number: 4,715,879

[45] Date of Patent: Dec. 29, 1987

[54] METHOD FOR THE MANUFACTURE OF A TEMPERED AND/OR CURVED GLASS PANE WITH REDUCED TRANSMISSION

[76] Inventors: Franz-Josef Schmitte, Rudolfstr. 1; Dieter Müller, Auf der Reihe 3, both of D-4650 Gelsenkirchen; Rolf Groth, Holzstr. 218, D-4630 Bochum 6, all of Fed. Rep. of Germany

[21] Appl. No.: 927,174

[22] Filed: Nov. 5, 1986

[30] Foreign Application Priority Data

Nov. 5, 1985 [DE] Fed. Rep. of Germany ....... 3539130
Nov. 28, 1985 [DE] Fed. Rep. of Germany ....... 3542036
Dec. 18, 1985 [DE] Fed. Rep. of Germany ....... 3544840

[51] Int. Cl.⁴ ............................................. C03C 17/00
[52] U.S. Cl. ...................................... 65/60.2; 65/60.4; 65/106; 65/114
[58] Field of Search .................. 65/60.2, 60.4, 106, 65/107, 114

[56] References Cited

U.S. PATENT DOCUMENTS 4,170,460 10/1979 Donley ............................ 65/60.4 X
4,329,379 5/1982 Terneu et al. .................... 65/60.2 X

FOREIGN PATENT DOCUMENTS 1283432 7/1972 United Kingdom ................ 65/60.4
1524650 9/1978 United Kingdom ................ 65/60.4

Primary Examiner—Arthur Kellogg
Attorney, Agent, or Firm—Hill, Van Santen, Steadman & Simpson

[57] ABSTRACT

Method for the manufacture of a prestressed and/or curved glass pane of soda-lime-silica glass having reduced transmission in a prescribable spectral range (in prescribable spectral ranges), in particular a sunshade pane, whereby at least one metal layer having a majority content of a metal or of a metal alloy from the elements having the atomic numbers 22 through 28 of the periodic table is applied to at least one side of a glass carrier and a protective layer of at least one metal oxide or mixed metal oxide is applied to that side thereof facing away from the glass carrier, and whereby a thermal prestressing and/or bending process is carried out in air at a temperature of 580° C. through 680° C., preferably 600° C. through 650° C., characterized in that both the metal layer as well as the protective layer are applied to the essentially planar glass carrier before the thermal prestressing and/or bending process; and in that the protective layer is applied with an oxygen deficit x, referrred to a metal atom of the metal oxide or, respectively, oxides, of $0.05 \leq x \leq 0.4$ and in a thickness from 10 nm through 100 nm, being applied in such a composition that no noteworthy oxygen diffusion into the metal layer occurs during the prestressing and/or bending process.

12 Claims, 6 Drawing Figures

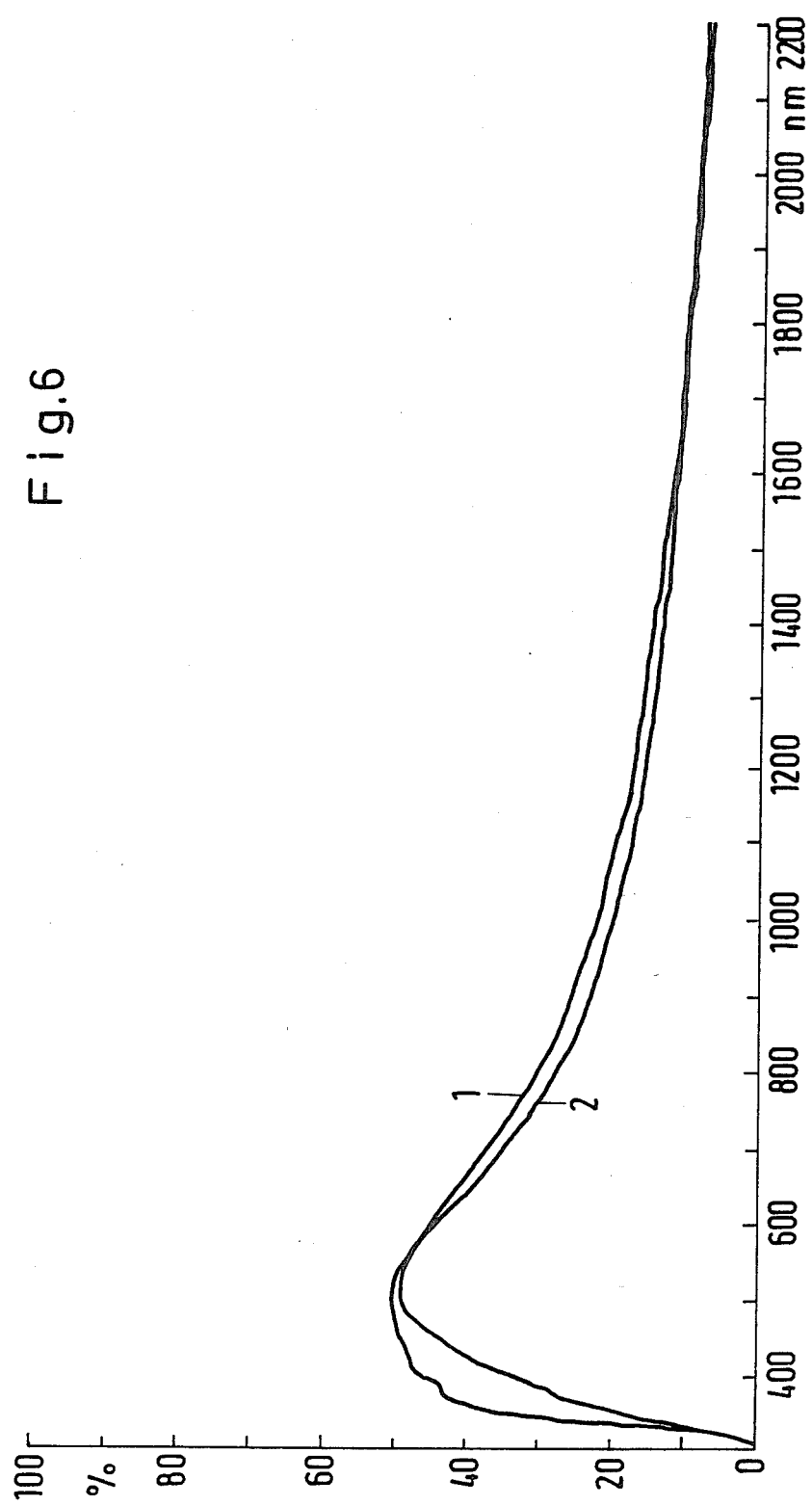

METHOD FOR THE MANUFACTURE OF A TEMPERED AND/OR CURVED GLASS PANE WITH REDUCED TRANSMISSION

LIST OF REFERENCE NUMERALS

10 Glass Carrier
12 Metal Layer
14 Protective Layer
16 Intermediate Layer
18 Cover Layer The invention relates to a method for the manufacture of a tempered and/or curved glass pane of soda-lime-silica glass having reduced transmission in prescribable spectral regions (a prescribable spectral region), particularly a sunshade pane, whereby at least one metal layer having a majority content of a metal or of a metal alloy from the elements having the atomic numbers 22 through 28 of the periodic table is applied to at least one side of a glass carrier and a protective layer of at least one metal oxide or mixed metal oxide is applied to that side thereof facing away from the glass carrier and whereby a thermal tempering and/or bending process is carried out in air at a temperature of 580° C. through 680° C., preferably 600° C. through 650° C.

Glass panes which comprise a surface coating of a metal or of a metal alloy and, following thereupon, a protective layer of a metal oxide or, respectively, a mixed metal oxide are employed in the construction sector and in vehicle glazing in order to reduce the transmission of the coated glass carrier in defined spectral regions. This is carried out, for example, in order to obtain a light-attenuating effect and/or a sunshade effect, whereby metals or metal alloys from the elements having the atomic numbers 22-28 of the periodic table are preferably employed for the metal layer when glass panes neutral in color are desired. In many such applications, it is necessary to thermally temper the glass carrier. For example, this is done in order to increase the mechanical stability, it order to avoid thermal cracks and in order to reduce the injury hazard if the pane breaks.

For producing the thermal tempering, the panes of soda-lime-silica glass which are nearly used exclusively in the said application are quickly heated in air to a temperature above the transformation temperature of the glass and are subsequently quenched. The temperatures required for the tempering process thereby lie in the range from 580° C. to 680° C., preferably in the range from 600° C. to 650° C. The same temperature range is also required when the glass panes rpovided flat from glass production are to be subjected to a bending process in order to obtain curved glass panes in certain applications, for example in the automobile sector.

Just like the application of the metal oxide layer, of course, the application of the metal layer in the method of the species hitherto ensued after the conclusion of the tempering or, respectively, bending process and after the panes had been cooled, whereby vacuum coating processes were usually employed thereto.

This procedure of executing the coating following the tempering or, respectively, bending rpocess has various disadvantages in comparison to a procedure wherein the coating is applied first and the prestressing or, respectively, bending process would be carried out subsequently. In the former instance, thus, only fixed dimensions can be coated since, as known, tempered panes cannot be cut. For the coating technique, by contrast, it is far more favorable to coat uniform dimensions, particularly the band dimension of glass production in the floating process. In the latter instance, the problems of a uniform layer thickness in vacuum coatings can be far more easily and simply resolved than when fixed dimensions having corresponding gaps between the panes in the coating field are coated. Added thereto is that transport of such uniform dimensions through the coating systems is far less involved than when individual pieces having different dimensions must be transported.

A further disadvantage is comprised therein that impurities on the glass surface frequently enter into such a firm bond with it due to the high temperatures of the tempering or, respectively, bending process that they can no longer be as thoroughly removed in the following surface cleaning before implementation of the coating process as required for the subsequent coating process. They have been quasi burned into the glass surface. This leads to a disturbing deterioration of the coating quality.

Of course, the problems of obtaining an adequate coating uniformity are especially great when coating curved panes because angle relative to and distance from the coating sources additional change due to the curvature of the panes. Added thereto is that the expense for vacuum coating systems for coating curved panes is significantly higher than that for coating planar panes since entry and exit locks as well as locks between different coating stations must be fashioned significantly broader than when coating planar glass.

For the said reasons, a procedure wherein planar glass, particularly in the form of uniform dimensions, is coated and is subsequently tempered or, respectively, bent—particularly after the fixed dimensions have been produced by cutting—has considerable advantages. This procedure, however, cannot be implemented in the method of the species, i.e. given the metal layers that are utilized for the said applications, because disturbing layer modifications—especially due to axidation of the layers—are produced by the required temperatures above 480° C.

This derives, for example, from German OS No. 17 71 223. This discloses a method for the production of oxide layers in accord wherewith metal layers, or respectively, sub-oxidic layers of these metals produced by vaccum evaporation, particularly layers from the group of metals cobalt, iron, manganese, cadmium, bismuth, copper, gold, lead and nickle, are subjected to a termal treatment step at temperatures between 315° C. and 677.5° C. and are thereby converted into the corresponding oxides. The transmission of the layers, particularly in the near infrared, however, is increased due to the conversion into the oxides. The sunshade effect is thus undesirably deteriorated in comparison to that of metal layers.

In addition to metal layers, combinations of these layers with transparent oxide layers are also proposed. Thus, a transparent oxide layer can be arranged on that side of the metal layer facing away from the glass carrier as a protective layer for improving the mechanical properties or, given formation as a quarter-wavelength layer for the visible range, can be provided as an antireflection layer for increasing the selective transmission. It is provided in a further embodiment of such layer systems that the metal layer be embedded at both sides in high-refractive antireflection layers of metal oxides (see, for example, Japan OS No. 54-058719). Over and above this, it has likewise already been proposed to arrange a further, thin metal layer between the metal layer and the antireflection layer which is arranged on that side of the metal layer facing away from the glass carrier, this further, thin metal layer being provided in order to enhance the longterm durability of such layer systems (European OS No. 00 35 906).

Investigations that have been carried out have shown that no adequate stability can be achieved in layer arrangements like those set forth above wherein a metal layer is protected by an oxide layer on the side facing away from the glass carrier when these layer arrangements are exposed to a temperature stress as occurs in the tempering or, respectively, bending process.

A layer arrangement like that also obtained given the method of the species is also fundamentally known, for example, from U.S. Pat No. 3,846,152.

For the manufacture of curved automobile panes with electrically conductive metal oxide coating, European OS No. 01 08 616 teaches that the bending process be executed at a prescribed, sub-stoichiometric condition of the metal oxide layer in order to avoid the formation of cracks. German Pat. No. 917 347 discloses a method for the manufacture of electrically conductive layers wherein a sub-stoichiometric tin oxide layer or indium oxide layer is applied to a glass carrier and a conversion into the full oxide is subsequently carried out by heating in air. U.S. Pat. No. 3,962,488 as well as U.S. Pat. No. 4,017,661 likewise relate to the manufacture of electrically conductive coatings having high light transmittance wherein, however, a silver or gold layer is embedded at both sides in titanium oxide layers and the titanium oxide layers are applied with an oxygen deficit in order to avoid the formation of agglomerates of the precious metal layer. Finally, German OS No. 30 27 256 discloses the employment of sub-stoichiometric titanium oxide layers as a constituent of cover layers for transmission-modifying metal layers with the intent of improving the corrosion resistance, etc., of the metal layers in this way in addition to further measures. However, the materials combinations recited in these latter publications, particularly given a procedure in accord with German OS No. 30 27 256, cannot be utilized such in a method of the species that, modifying the previously known process management, the coating of the glass carrier ensued before the tempering process: such a procedure, namely, thereby inevitably leads to a disturbing modification of the metal layer, whether due to oxidation or due to agglomeration, so that these publications can likewise provide no teaching for avoiding the disadvantages of the method of the species.

It is therefore the object of the invention to improve the method of the species such that the method-oriented disadvantages connected with the coating of the glass carrier subsequent to the tempering or, respectively, bending process are avoided and the required coating measures can already be implemented before the tempering and/or bending process without the risk of layer modifications in the metal layer.

This object is achieved in accord with the invention in that both the metal layer as well as the protective layer are applied to the essentially planar glass carrier before the tempering and/or bending process; and in that the protective layer is applied with an oxygen deficit x, referred to a metal atom of the metal oxide or metal oxides, of $0.05 \leq x \leq 0.4$ and in a thickness from 10 nm to 100 nm, being applied in such a composition that no noteworthy oxygen diffusion down to the metal layer occurs in the tempering and/or bending process.

A preferred embodiment of the invention is distinguished in that a layer of or having a majority content of at least one metal oxide or mixed metal oxide from the group Sn, In, Ta is applied as protective layer. It can thereby be provided that the oxygen deficit lies in the range $0.1 \leq x \leq 0.3$.

Further, the invention also provides that an indium oxide layer having the composition $InO_{1.5-x}$ is applied as protective layer.

Alternatively thereto, the invention may provide that a tin oxide layer having the composition $SnO_{2-x}$ is applied as the protective layer.

It can also be provided in accord with the invention that a tantalum oxide layer having the composition $TaO_{2.5-x}$ is applied as the protective layer.

A further embodiment of the invention proposes that the thickness of the protective layer amount to at least 13 nm.

One can thereby proceed such that the thickness of the protective layer amounts to about 20 nm through 70 nm.

It can thereby be provided in a further development that a cover layer of at least one metal oxide in an essentially stoichiometric composition is applied to the protective layer.

In a specific embodiment, further, the invention is characterized in that the cover layer comprises at least one metal oxide from that group from which the metal oxide or metal oxides for the protective layer is or are selected.

One can thereby proceed such that the metallic composition of the cover layer corresponds to that of the protective layer.

Finally, the invention may also provide that at least one sub-layer of a metal, a metal alloy, a metal oxide or a mixed metal oxide is applied to the glass carrier before the application of the metal layer (layers).

The invention, wherein, of course, the light transmittance of the glass pane can be reduced to zero when, for example, tempered spandral plates or the like are to be manufactured, is based on the surprising perception that a protective effect of an oxide layer applied to that side of the metal layer facing away from the glass carrier which is required for the tempering or, respectively, bending is achieved when the composition of the oxide layer deviates from the stoichiometric composition of the appertaining oxide. What is required is an oxygen deficit which dare not exceed or, respectively, fall below a maximum value and a minimum value. It is also necessary that, given a metal layer having a majority content of a metal or a metal alloy from the elements having the atomic numbers 22-28 of the periodic table, the protective layer be composed of suitable material proposed in accord with the invention; a materials combination as disclosed, for example, by German OS No. 30 27 256 would be entirely unusable since the metal layer would be unavoidably destroyed when heating the panes disclosed therein to bending, or respectively, tempering temperature.

This result is unanticipated. One would assume, namely, that the influence of oxygen on the metal layer during heating would be at a minimum when the stoichiometric composition is present for the protective layer. As known, namely, the diffusion through a layer ensues via voids in the layer. The number of these, however, is lowest when the stoichiometric composition of the oxide is present. The reasons for the observed protective effect in the region of a specific oxygen deficit are unknown.

It is also surprising that the oxygen deficit of the protective layer dare not exceed a prescribed value either. Thus, layers having a higher oxygen deficit are unsuitable. A more pronounced modification of the optical data of the metal layer to be protected again occurs given the employment of such layers; in particular, spots are formed and opacity phenomena occur after the temperature treatment. It is to be suspected that the protective layer is irregularly oxidized in this especially highly sub-stoichiometric region, so that the formation of additional grain boundaries with increased oxygen diffusion are formed or cracks arise in the coating. Here, too, only guesses are possible due to the complexity of the processes.

Suitable as materials for the metal layer are the elements having the atomic numbers 22–28 of the periodic table, particularly the metals chromiun, iron, nickel, titanium and vanadium, as well as alloys of these metals; but compositions having a majority content of one of the above metals or metal alloys are also suitable. For example, chromium-iron-aluminum alloys have proven themselves.

Layers of or having a majority constituent of at least one metal oxide or mixed metal oxide from the group Sn, In, Ta have proven suitable as protective layers. As already stated, these oxide layers or mixed oxide layers must exhibit a specific oxygen deficit in deviation from the stoichiometric composition of the oxides. Respectively referred to a metal atom of the corresponding oxides, this deficit is roughly the same. The required composition corresponds to the relationships $InO_{1.5-x}$, $SnO_{2-x}$, $TaO_{2.5-x}$, whereby x lies in the range $0.05 \leq x \leq 0.4$.

It has turned out that the thickness of the oxide layer having the oxygen deficit dare not fall below a minimum value for an adequate protective effect to be present in combination with the temperature cycle of the tempering or, respectively, bending process. This minimum thickness lies at about 10 nm, preferably at 13 nm.

Thicker layers can likewise be employed. This is the case, for example, when additional optical effects such as, for example, an antireflection effect or a chromatic effect are to be achieved via their interference effect on the metal layer. The oxide layers required for this purpose thereby generally lie in the range from about 20 nm through 70 nm.

Given the existing oxygen deficit of the protective layers, these still generally exhibit a hardness and abrasion resistance as required for the further manipulation of the coated glass carrier before the tempering or, respectively, bending. However, these values lie somewhat below those that are achieved with oxide layers having a stoichiometric composition.

A method wherein the protective layer with oxygen deficit is applied frist in the required minimum thickness and a further oxide layer is applied thereover has proven itself for further improvement of the layer hardness and abrasion resistance. The second oxide layer can be an oxide layer having the stoichiometric compisition of the same metal as employed in the protective layer. However, an oxide layer of some other metal can also be applied. This method of applying a double layer is especially advantageous when, due to desired optical effects, the required layer thickness exceeds the minimum value for the protective effect since this viewpoint can then be combined with an even more improved layer hardness. Within the scope of the idea of the invention, moreover, it is of course definitely possible to arrange further layers, for example silver or palladium layers or the like, between the glass carrier and the metal layer dependent on the desired spectral properties or, respectively, general optical properties, insofar as the metal layer has its side facing away from the glass carrier protected in the way essential to the invention, protected namely against in-diffusion of oxygen at the times and temperatures required for the bending and/or tempering processes by a sub-stoichiometrically applied protective layer having the composition and thickness of the invention.

The protection of the coating in accord with the invention usually ensues by vacuum evaporation. The layers can thereby be applied by vacuum evaporation from resistance-heated vaporization apparatus or, on the other hand, can also be applied by electron beam vaporization. Further, cathode sputtering in the form of dc sputtering or low-frequency sputtering but, in particular, also in the form of radio-frequency and MAGNETRON sputtering are also suitable. The metal or, respectively, metal alloy layers can thereby be produced either by direct vaporization or sputtering in neutral atmosphere. The method of reactive vaporization, in particular the method of reactive sputtering are suitable for the manufacture of the oxide layers. Thereby especially economical is the method of reactive MAGNETRON sputtering wherein appropriate metal or metal alloy targets are sputtered in an atmosphere which contains, among other things, oxygen. The required oxygen deficit of the layer can be set well-defined in this method.

What is to be understood, moreover, by a metal layer having a majority content of a metal or of a metal alloy from the elements having the atomic numbers 22 through 28 of the periodic table in conjunction with the invention is a metal layer whose properties are essentially defined by the said elements. As a rule, this is the case given layers wherein the content of one or more of these elements amounts to a total of at least two atomic percent. The analogous case applied to the protective layers of the invention having a majority content of at least one metal oxide or mixed metal oxide from the group Sn, In, Ta, whereby the layer propeties in these protective metal oxide layers are to be defined by those of the said metal oxides. As a rule, this is the case given layers wherein the content of In, Sn and/or Ta amounts to a total of at least 50 atomic percent with reference to the overall metal content of the oxide layer.

Figure 2:
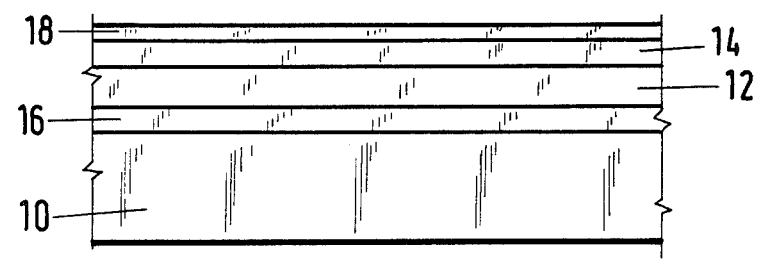
Figure 3:
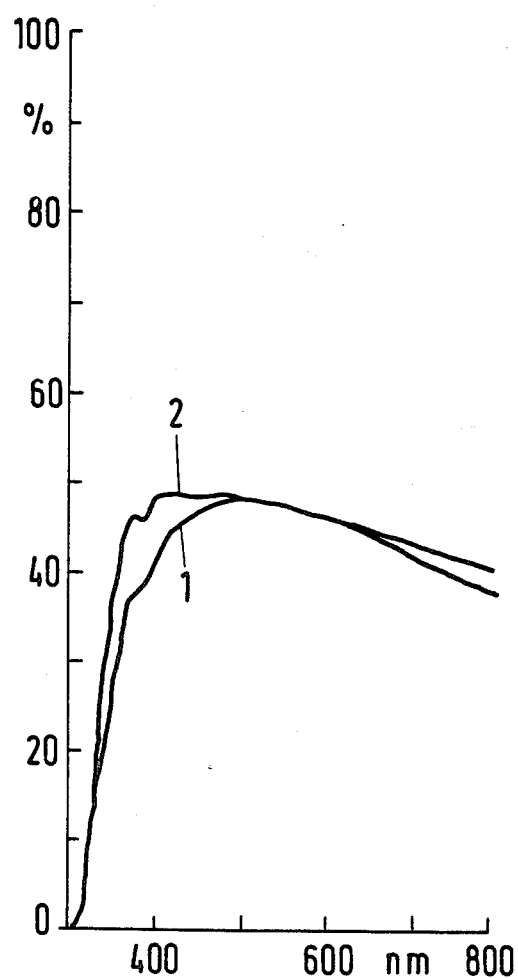
Figure 4:
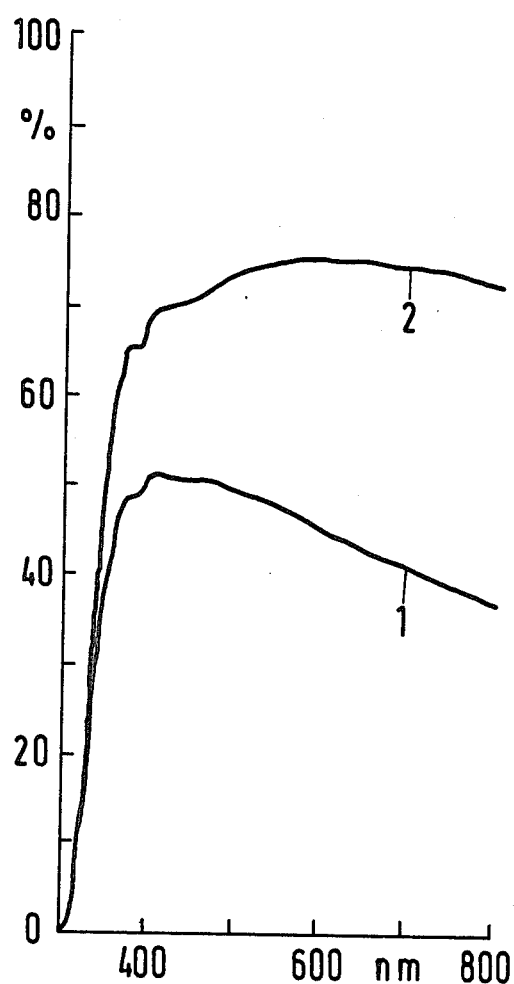
Figure 5:
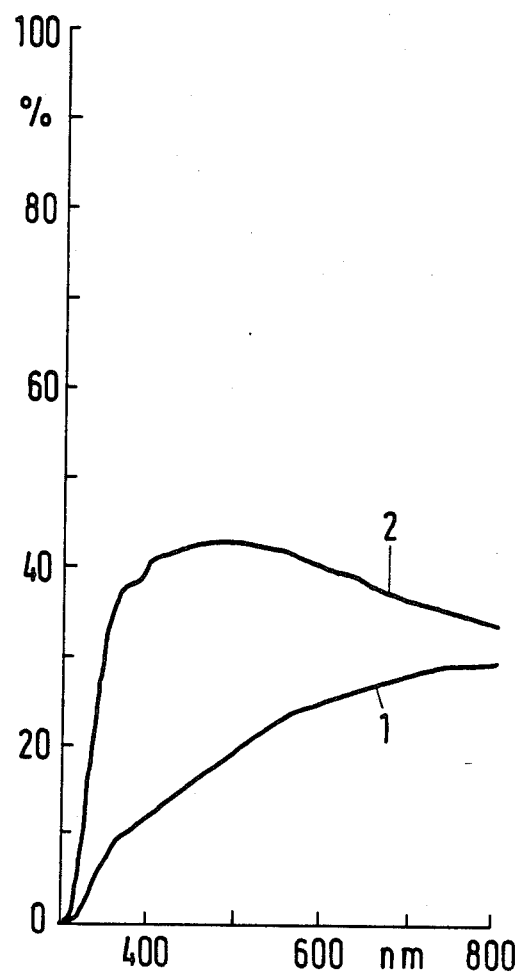

Further features and advantages of the invention derive from the following description in which exemplary embodiments are set forth in detail with reference to the schematic drawing. Thereby shown are:

FIG. 1 a first exemplary embodiment of a glass pane manufacturable in accord with the method of the invention, shown in a section perpendicular to the plane of the pane;

FIG. 2 a further exemplary embodiment of a glass pane manufacturable in accord with the method of the invention, likewise shown in a section perpendicular to the plane of the pane;

FIG. 3 the spectral transmission before and after the execution of the tempering process for the glass pane manufactured in accord with Example I;

FIG. 4 the spectral transmission before and after execution of the tempeing process for Example II;

FIG. 5 the spectral transmission of the glass pane manufacture in accord with Example III before and after the tempering process; and FIG. 6 the corresponding results of the spectral measurements given procedures in accord with Example IV.

In the exemplary embodiment shown in FIG. 1, a metal layer 12 of nickel having a thickness of 10 nm is applied to a glass carrier 10, this metal layer 12 being followed by a protective layer 14 having a thickness of 20 nm which has the composition $SnO_{1.7}$ before the tempering process.

In the exemplary embodiment of FIG. 2, the glass carrier 10 successively carries a sub-layer 16 of $In_2O_3$ having a thickness of 6 nm acting as adhesion-promoting layer, a metal layer 12 of cobalt having a thickness of 22 nm, a protective layer 14 which has the composition $SnO_{1.7}$ before the tempering process and comprises a thickness of 16 nm, as well as a cover layer 18 of $SnO_2$ comprising a thickness of 20 nm.

Panes of the type shown in FIGS. 1 and 2 can be manufactured in accord with the examples set forth below given appropriate procedures:

EXAMPLE I

In a vacuum coating system that was equipped with coating apparatus for MAGNETRON cathode sputtering, the following layers were successively applied to a float glass pane having the format 10 cm×10 cm: First, a nickel layer in a thickness of 8.5 nm, applied by sputtering a nickel target in an argon atmosphere at a pressure of $5 \cdot 10^{-3}$ mbar. Subsequently, a tin oxide layer was applied to the nickel layer by reactive sputtering of a tin target and an argon-oxygen atmosphere having a 40% oxygen constituent at a pressure of $4 \cdot 10^{-3}$ mbar. The coating parameters of the reactive sputtering were thereby selected such that the layer exhibited the composition $SnO_{1.83}$. The composition was thereby identified after production of the overall coating, having been identified via an Auger electron analysis. The thickness of the layer amounted to 28 nm.

In direct vision and when observed proceeding from the glass side, the coated pane exhibited a neutral appearance. The coated pane was subsequently heated to 600° C. in a tempering furnace and was quenched. the appearance of the pane was hardly changed due to the tempering process.

Curve 1 and curve 2 in FIG. 3 show the spectral transmission before and after the execution of the prestressing process for the wavelength range from 300 through 800 nm. As may be seen from FIG. 3, the change in transmission is slight, especially in the visible spectral region. These minimal changes are probably produced by the further oxidation of the outer protective layer in the tempering process and the decrease of the residual absorption present given the oxygen deficit which is connected therewith. Also added thereto are annealing effects due to this temperature treatment such as generally occur given vacuum layers.

EXAMPLE II

Procedures were as in Example I with the difference that the tin oxide layer was applied without measurable oxygen deficit as the result of an appropriate selection of the coating parameters, i.e. was applied in accord with the stoichiometric composition of $SnO_2$.

The results of the spectral measurements before and after the implementation of the tempering process at 600° C. are shown in FIG. 4 as curves 1 and 2. They show that the transmittance has increased considerably due to the tempering process, i.e. a noteworthy light attenuation and sunshade effect are no longer present.

EXAMPLE III

Procedures were as in Example I with the difference that the coating parameters in the manufacture of the tin oxide layer were set such that a sub-oxidic layer having the composition SnO derived.

The spectral transmission of the coated pane before the prestressing process is shown as curve 1 in FIG. 5. Caused by the high absorptivity of the SnO layer, significantly lower transmittance values than in Examples I and II derive. After execution of the prestressing process (curve 2), a considerable boost in transmittance occurs. Over and above this, the coating exhibited a spotty appearance and is thus unsuitable for the said applications.

EXAMPLE IV

The following layers were successively applied to a float glass pane of 10 cm×10 cm in the coating system of Example I:

an $SnO_2$ layer having a thickness of 20 nm, applied by reactive sputtering of a tin target at a pressure of $4 \cdot 10^{-3}$ mbar in an argon-oxygen atmosphere having the composition 50% $O_2$, 50% Ar;

a nickel layer 2 nm thick, applied by sputtering of a nickel target in an argon atmosphere at a pressure of $4 \cdot 10^{-3}$ mbar;

a silver layer 8 nm thick, applied by sputtering of a silver target in an argon atmosphere at a pressure of $3 \cdot 10^{-3}$ mbar;

a nickel layer 3 nm thick, applied by sputtering of a nickel target in an argon atmosphere at a pressure of $4 \cdot 10^{-3}$ mbar;

a tin oxide layer having the composition $SnO_{1.70}$ and comprising a thickness of 30 nm, applied by reactive sputtering of a tin target at a pressure of $4 \cdot 10^{-3}$ mbar in an argon-oxygen atmosphere having the composition 35% $O_2$, 65% Ar.

In direct vision, the coated pane exhibited a slight umbral color distortion; the pane was practically neutral when viewed from the glass side. The spectral measurements that were carried out show (curve 1, FIG. 6) that the pane exhibited a high light transmittance in the visible region in combination with low transmittance in the near infrared, i.e. the sunshade effect is very good.

After execution of the prestressing process, the transmittance curve shown as curve 2 derived. It shows that the optical data for the total radiation range of the sun are essentially preserved. Only in the shortwave, visible spectral range is the transmittance somewhat higher than before. This boost in transmittance which is probably caused by the re-oxidation of the $SnO_{1.7}$ layer reduces the originally extant, slight color distortion and thus improves the transparency.

The features of the invention disclosed in the above description, in the drawing and in the claims can be essential to the realization of the various embodiments of the invention both individually as well as in arbitrary combinations.

We claim:

1. Method for the manufacture of a prestressed and/or curved glass pane of soda-lime-silica glass having reduced transmission in a prescribable spectral range (in prescribable spectral ranges), in particular a sunshade pane, whereby at least one metal layer having a majority content of a metal or of a metal alloy from the elements having the atomic numbers 22 through 28 of the periodic table is applied to at least one side of a glass carrier and a protective layer of at least one metal oxide or mixed metal oxide is applied to that side thereof facing away from the glass carrier, and whereby a thermal prestressing and/or bending process is carried out in air at a temperature of 580° C. through 680° C., preferably 600° C. through 650° C., characterized in that both the metal layer as well as the protective layer are applied to the essentially planar glass carrier before the thermal prestressing and/or bending process; and in that the protective layer is applied with an oxygen deficit x, referred to a metal atom of the metal oxide or, respectively, metal oxides, of $0.05 \leq x \leq 0.4$ and in a thickness from 10 nm through 100 nm, being applied in such a composition that no noteworthy oxygen diffusion into the metal layer occurs during the prestressing and/or bending process.

2. Method according to claim 1, characterized in that a layer of or having a majority content of at least one metal oxide or mixed metal oxide from the group Sn, In, Ta is applied as protective layer.

3. Method according to claim 1 or 2, characterized in that the oxygen deficit lies in the range $0.1 \leq x \leq 0.3$.

4. Method according to claim 1, characterized in that an indium oxide layer having the composition $InO_{1.5-x}$ is applied as protective layer.

5. Method according to claim 1, characterized in that a tin oxide layer having the composition $SnO_{2-x}$ is applied as protective layer.

6. Method according to claim 1, characterized in that a tantalum oxide layer having the composition $TaO_{2.5-x}$ is applied as protective layer.

7. Method according to claim 1, characterized in that the thickness of the protective layer amounts to at least 13 nm.

8. Method according to claim 7, characterized in that the thickness of the protective layer amounts to about 20 nm through 70 nm.

9. Method according to claim 1, characterized in that a cover layer of at least one metal oxide in an essentially stoichiometric composition is applied to the protective layer.

10. Method according to claim 9, characterized in that the cover layer comprises at least one metal oxide from that group from which the metal oxide or the metal oxides for the protective layer is or are selected.

11. Method according to claim 10, characterized in that the metallic composition of the cover layer corresponds to that of the protective layer.

12. Method according to claim 1, characterized in that at least one sub-layer of a metal, a metal alloy, a metal oxide or a mixed metal oxide is applied to the glass carrier before application of the metal layer (layers).

* * * * *